May 7, 1957 R. FONT 2,791,706

TEMPERATURE-CONTROLLED ENCLOSURE FOR ELECTRICAL COMPONENTS

Filed Dec. 6, 1954 2 Sheets-Sheet 1

INVENTOR.
RAMON FONT
BY Herman L. Gordon
ATTORNEY

TEMPERATURE-CONTROLLED ENCLOSURE FOR ELECTRICAL COMPONENTS

Filed Dec. 6, 1954 2 Sheets-Sheet 2

INVENTOR.
RAMON FONT
BY Herman L. Gordon
ATTORNEY

United States Patent Office 2,791,706

Patented May 7, 1957

2,791,706

TEMPERATURE-CONTROLLED ENCLOSURE FOR ELECTRICAL COMPONENTS

Ramon Font, Richmond Hill, N. Y., assignor to Premier Research Laboratories, Inc., New York, N. Y., a corporation of New York Application December 6, 1954, Serial No. 473,117

12 Claims. (Cl. 310—8.9)

This invention relates to enclosures for electrical components, and more particularly to temperature-controlled enclosures for piezo-electric crystals, and the like.

A main object of the invention is to provide a novel and improved temperature-controlled holder for electrical components, such is piezo-electric crystals, inductances, capacitors, transistors, or similar components which must be maintained at a constant temperature, said holder being simple in construction, being inexpensive to manufacture, being easy to assemble and disassemble without damage to the internal parts thereof, and being reliable in operation.

A further object of the invention is to provide an improved temperature-controlled holder for crystals or other electrical components, which is relatively compact in size, which is highly resistant to shocks or impacts, which may be readily taken apart for adjustment, or for any other reason, without injury to any part thereof, and which provides accurate control of the temperature of the components contained therein over a wide range of service conditions.

A still further object of the invention is to provide an improved multiple-crystal temperature-controlled holder for containing a plurality of crystal units of the type having thermally conductive housings, for example, metal housings, the improved holder being provided with heating means arranged in direct conductive thermal contact with the crystal units, whereby required increments of heat may be transmitted rapidly to the crystal units, the heat-conducting means also serving as a cushioning means to resiliently hold the crystal units against undesired movement due to shock and impacts.

A still further object of the invention is to provide an improved temperature-controlled enclosure for electrical components wherein a novel arrangement of heaters is provided, said heaters being arranged to protect the components against the effects of sudden and severe changes in external temperature by applying heat in a manner which minimizes overshoot in temperature within the enclosure, otherwise caused by the inherent thermal lag of the temperature-responsive elements controlling the heaters.

Further objects and advantages of the invention will become apparent from the following description and claims and from the accompanying drawings, wherein:

Figures 1, 2, 5:
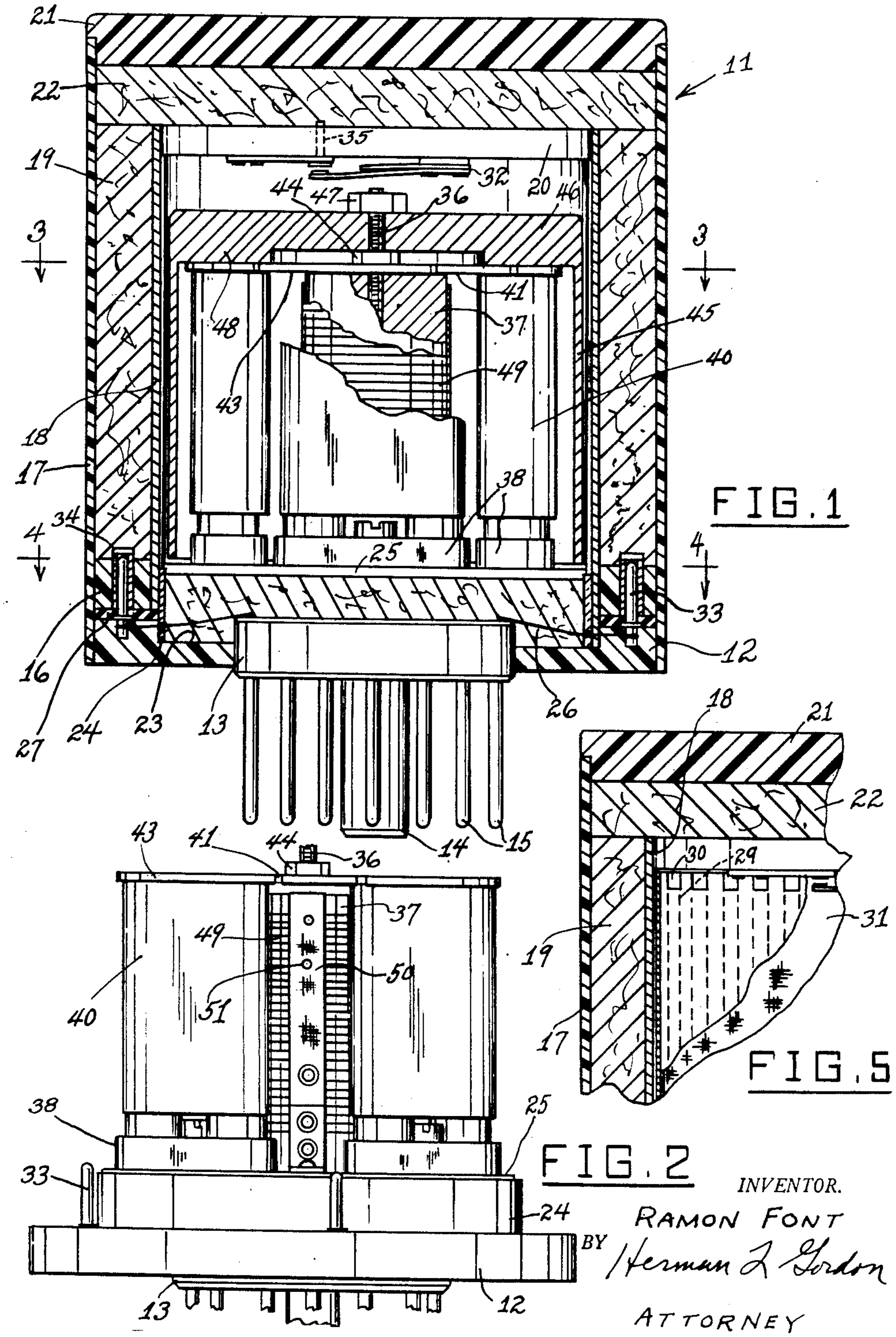
Figure 1 is a vertical cross-sectional view taken through an improved temperature-controlled enclosure according to the present invention, showing a plurality of metal-jacketed crystal units operatively mounted in the enclosure and arranged to be controlled in temperature thereby.
Figure 2 is a fragmentary elevational view showing the base of the enclosure of Figure 1, with the crystal units mounted thereon and resiliently secured thereto by the conductive heat transmitting means of the present invention.
Figure 5 is a fragmentary vertical cross-sectional view taken through an upper portion of the main housing of the enclosure of Figure 1.

Referring to the drawings, 11 generally designates a temperature-controlled holder according to the present invention, said holder being adapted to contain piezo-electric crystals or other electrical components to be maintained at a constant temperature.

The holder 11 comprises a circular base 12 formed of insulating material and having centrally secured therein a multiple-pronged male plug 13 having the central depending key element 14 and the depending contact prongs 15, said contact prongs 15 being engageable with the contacts of a female socket to establish the electrical connections of the unit to its external sockets.

Designated at 16 is an annular ring of insulating material, to the exterior periphery of which is secured the rigid outer cylindrical shell 17 of insulating material, and to the interior periphery of which is secured the rigid inner cylindrical shell 18. Disposed between the shell members 17 and 18 is a mass of heat-insulation material 19, such as felt, or the like.

Secured in the top portion of inner shell 18 is an inner cover disc 20 of rigid insulating material, and secured on the top rim of the outer shell 17 is an outer cover disc 21, also of rigid insulating material. A mass 22 of felt or similar heat-insulating material is disposed between outer cover disc 21 and the top rim of felt mass 19, and inner cover disc 20, as shown.

Base 12 is formed with a circular recess 23 in which is secured an upstanding cylindrical flange member 24 of rigid insulating material, such as Fiberglas tubing, or the like. Rigidly secured in the top portion of flange member 24 is a rigid disc 25 of insulating material. A mass of heat-insulating material 26 is disposed between disc 25 and the bottom wall of recess 23.

As shown, the lower portion of outer shell 17 receives the base member 12, and an annular gasket 27 of resilient deformable material is disposed between ring member 16 and the rim portion of base member 12. The base member 12 is formed with apertures 28 through which suitable screws may be passed upwardly to engage suitable tapped holes in the ring member 16 to detachably secure the main portion of the enclosure to the base member.

Secured on the inside surface of the inner shell member 18 and covering the major portion of said inside surface is a first heater winding 29, said winding comprising a heater wire looped vertically on a shell 30 of suitable insulating refractory sheet material 31 of varnished cambric or the like. Mounted on the bottom surface of the inner top cover disc 20 is a thermostatic switch 32.

Base 12 is provided with the upstanding prongs 33 which are conductively received in contact sleeves 34 mounted in the ring 16, said contact sleeves being respectively connected to the terminals of the heater winding 29 and the terminals of the thermostat 32. Prongs 33 are electrically connected by suitable wires to certain of the prongs 15, whereby the heater winding 29 and the thermostat may be connected to a suitable external heater energizing circuit.

It will be understood that the external connections are arranged in a well known manner so that the closure of the thermostat contacts causes the heater winding to be energized and the opening of said contacts deenergizes the heater winding. The thermostat is provided with an adjusting screw 35 so that the thermostat may be adjusted to close its contacts at a predetermined temperature in the space adjacent thereto.

Secured centrally to the disc member 25 is an upstanding axial stud member 36 on which is threadedly engaged a cylindrical block 37 of metal or other suitable heat-conducting material, said block being of substantial mass. Secured on the outer portions of the disc member 25 are the crystal sockets 38, said sockets being arranged symmetrically around the block 37 in the manner illustrated in Figures 3 and 4. The sockets 38 receive the prongs 39 of respective metal-jacketed crystal units 40, the block 37 being substantially coextensive in height with the crystal units 40, as shown in Figures 1 and 2.

Designated at 41 is a resilient metal washer which overlies the block 37 and which is radially slotted at 42 to define respective resilient, sector-shaped fingers 43 engaging the top walls of the respective metal-jacketed crystal units 40. The washer 41 has a central aperture through which the stud 36 passes, and a nut 44 is engaged on the stud over the washer to secure the washer in surface contact with the top surface of block 37. The resilient fingers 43 also engage the top walls of the units 40 in face-to-face engagement, thus thermally connecting the metal jackets of the units 40 to the block 37.

Designated at 45 is an inverted cylindrical cup member of metal or other suitable heat-conducting material, said cup member having a relatively massive top wall 46. Said top wall 46 is centrally apertured to receive the top portion of stud 36, as shown. The cup member 45 is disposed over the crystal units 40 to completely house the units. A clamping nut 47 is engaged on the stud 36 to secure the top wall 46 in clamping engagement with the outer portions of the washer 41, said wall being thickened at said outer portions, as shown at 48, to insure such clamping engagement. The cup member 45 is of substantial mass and acts as a heat reservoir, as will be presently explained.

Figure 3:
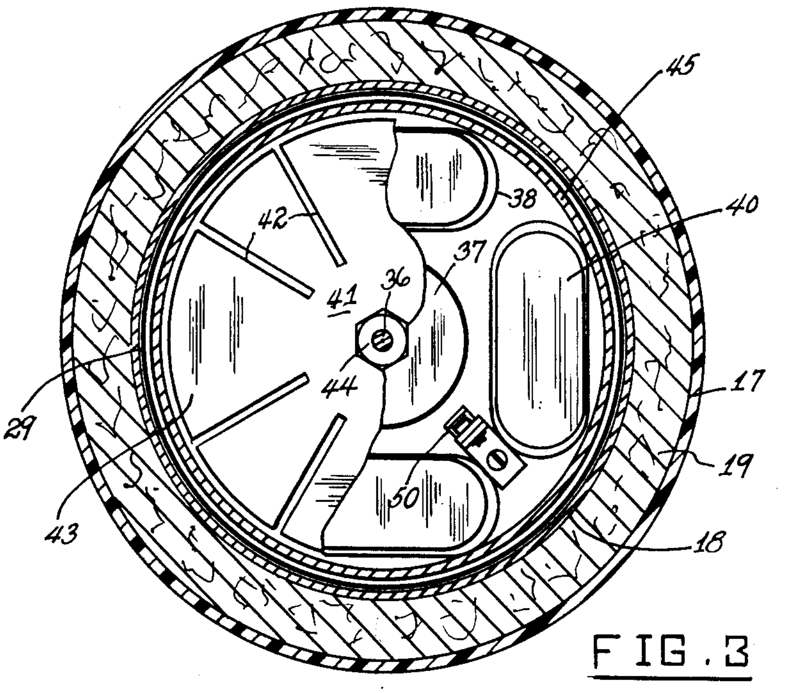
Figure 3 is a horizontal cross-sectional view taken on line 3—3 of Figure 1.
Figure 4:
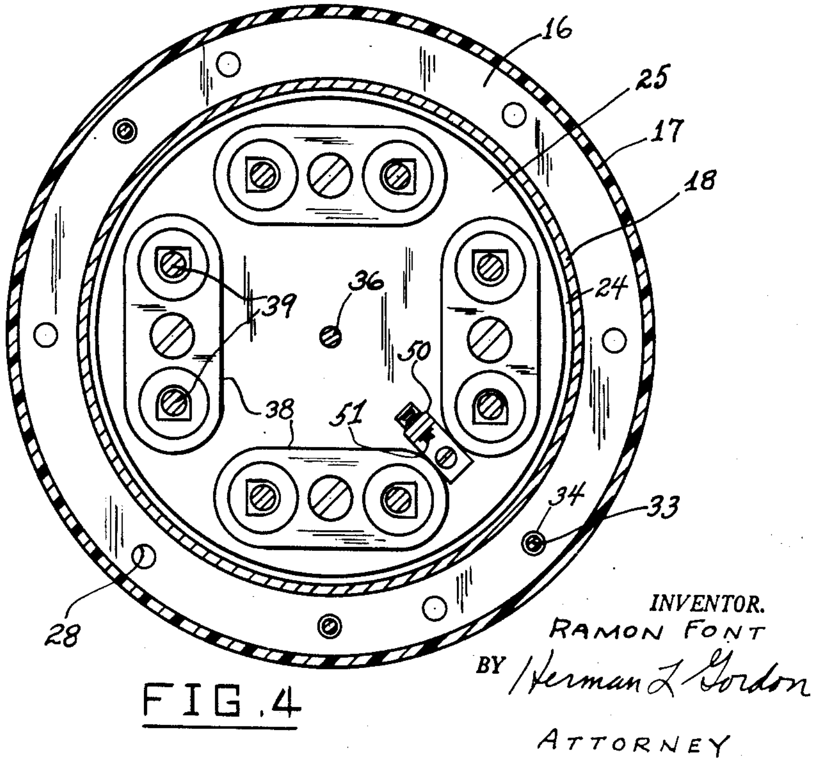
Figure 4 is a horizontal cross-sectional view taken on line 4—4 of Figure 1.

Mounted on the block 37 is a second heating winding 49 which is thus located in centered relation to the inner faces of the crystal units 40. A thermostat 50 is vertically mounted on disc 25 and extends upwardly in the space adjacent the inner surfaces of a pair of adjacent units 40, as shown in Figure 3.

The heater winding 49 and the thermostat 50 are electrically connected to certain of the prongs 15 for connection to an external energizing circuit in the same manner as prongs 33.

The terminals of the crystal sockets 38 are similarly connected to prongs 15 so that they may be connected to their external circuits.

Thermostat 50 is provided with an adjusting screw 51 so that it may be adjusted to allow the thermostat contacts to close at a predetermined temperature in the space adjacent block 37, to energize the heater winding 49.

From the above description, it will be apparent that the crystal units are housed in an annular cavity in the heat-storing body defined by the core block 37 and the cup member 45, and that the metal jackets of the crystal units are in direct thermal contact with this body through the washer 41. Washer 41 also acts as a resilient clamping means, since the resilient fingers 43 exert a certain amount of spring force on the top walls of the crystal jackets. This spring force may be augmented by forming the fingers 43 with a slight twist so that said fingers are placed under torsional tension when the clamping nut 47 is tightened down on the top wall 46 of cup member 45.

The temperature in the aforesaid annular cavity is under the control of the thermostat 50. The temperature outside the heat-storing body is under the control of the thermostat 32. By providing heat sources inside and outside the heat-storing body, heat is furnished to said body in such a manner that substantially no temperature differential exists between the inside and outside. Furthermore, the outside thermostat 32 may be set to close at a temperature slightly higher than the rated temperature value of the enclosure (at which thermostat 50 is set to close) to minimize thermal lag in bringing the heat-storing body up to rated temperature under severe operating conditions, such as may occur in aircraft service, wherein the apparatus may be exposed to sudden sharp decreases in ambient temperature. The heater winding 29 thus acts to establish a "heat barrier," preventing heat from escaping from member 45 at too rapid a rate to be adequately replenished by the inner heater 49.

It will be further noted that the holder may be easily disassembled, whenever required, for example, to change crystal units, to adjust the thermostats, or the like, without requiring the connections of the heater winding 29 and thermostat 32 to be unsoldered or otherwise damaged, by the provision of the contact sleeves 34 on ring 16 and the contact prongs 33 on base 12.

Obviously, although the holder has been described above as an enclosure for piezo-electric crystals, a holder according to this invention may be employed as a temperature-controlled enclosure for other electrical components, such as inductances, capacitors, transistors, vacuum tubes, or the like, within the spirit of the invention.

While a specific embodiment of a temperaurte-controlled holder for electrical components has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A temperature-controlled enclosure comprising a base provided with contact prongs, a main housing member detachably secured on said base, a first electric heater mounted on said main housing in heat-transmitting relation to the interior thereof, a heat-storing body of substantial mass mounted on said base and having an annular cavity to receive a member to be temperature-controlled, and a second electric heater mounted in said heat-storing body adjacent to and surrounding the inner wall of said cavity and connected to said prongs, said first electric heater being located adjacent to and extending completely around the outer wall of said annular cavity and being coaxial with the second heater.

2. A temperature-controlled enclosure comprising a base provided with contact prongs, a main housing member detachably secured on said base, contact elements on said base connected to said prongs, said main housing member including an inner shell and a heater winding mounted on said inner shell, further contact elements on said housing member connected to said heater winding, a heat-storing body of substantial mass mounted on said base and having an annular cavity to receive a member to be temperature-controlled, and a second heater winding mounted in said heat-storing body adjacent to and surrounding the inner wall of said cavity and connected to said prongs, said first-named heater winding being located inwardly adjacent to and extending completely around the outer wall of said annular cavity and being coaxial with said second heater winding.

3. A temperature-controlled enclosure comprising a base provided with contact prongs, a main housing member detachably secured on said base, upstanding prong elements on said base connected to said first-named prongs, contact sleeves on said housing member engageable with said upstanding prong elements, a first heater winding mounted on the inner wall of said housing member and connected to said contact sleeves, a heat-storing body of substantial mass mounted on said base and having an annular cavity formed to receive a member to be temperature-controlled, and a second heater winding in said heat-storing body adjacent to and surrounding the inner wall of said cavity, and connected to said first-named prongs, said first-named heater winding being located inwardly adjacent to and extending completely around the outer wall of said annular cavity and being coaxial with said second heater winding.

4. In a temperature-controlled enclosure, a base, an upstanding core member of substantial mass secured on said base, a heater winding mounted on and surrounding said core member, an inverted cup member of substantial mass secured on said core member and defining an annular cavity around said core member adapted to receive members to be temperature-controlled, a thermally insulating housing secured on said base around said cup member, and a second heater winding in said housing surrounding said inverted cup member.

5. In a temperature-controlled enclosure, a base, an upstanding core member of substantial mass secured on said base, a heater winding mounted on and surrounding said core member, an inverted cup member of substantial mass secured on said core member and defining an annular cavity around said core member adapted to receive members to be temperature-controlled, a thermally insulating housing secured on said base around said cup member, and a second heater winding mounted on the inside wall of said housing and surrounding said inverted cup member.

6. In a temperature-controlled enclosure, a base, an upstanding core member of substantial mass secured on said base, a heater winding mounted on and surrounding said core member, an inverted cup member of substantial mass secured on said core member and defining an annular cavity around said core member adapted to receive members to be temperature-controlled, a thermally insulating housing secured on said base around said cup member, a second heater winding in said housing surrounding said inverted cup member, a first thermostat mounted on said base and being controllingly connected to said first-named heater winding, and a second thermostat mounted in said housing externally of said cup member and being controllingly connected to said second heater winding.

7. In a temperature-controlled enclosure of the character described, a base, an upstanding core member of substantial mass secured on said base, a clamping plate of heat-conducing material centrally secured on said core member, substantially radial, resilient clamping arms on said clamping plate, an inverted cup member of substantial mass secured over said clamping plate and core member and defining a cavity therein adapted to receive members to be temperature-controlled between the wall of the cup member and said core member, and a heater winding on said core member.

8. A temperature-controlled crystal assembly comprising a base, an upstanding core member of substantial mass secured on said base, a crystal unit mounted on said base adjacent said core member, an inverted cup member secured on said core member and surrounding said crystal unit, a clamping plate of heat-conducting material centrally secured between the top of said core member and the top wall of said cup member and having substantially radial clamping arms engaging said crystal unit, and a heater winding on said core member.

9. A temperature-controlled crystal assembly comprising a base, an upstanding core member of substantial mass secured on said base, a crystal unit mounted on said base adjacent said core member, an inverted cup member secured on said core member and surrounding said crystal unit, a clamping plate of heat-conducting material centrally secured between the top of said core member and the top wall of said cup member, a radial resilient arm on said clamping plate engaging said crystal unit, and a heater winding on said core member.

10. A temperature-controlled crystal assembly comprising a base, an upstanding core member of substantial mass secured on said base, a crystal unit mounted on said base adjacent said core member, an inverted cup member of substantial mass centrally secured on said core member and surrounding said crystal unit, a clamping plate of heat-conducting material centrally secured between the top of said core member and the top wall of said cup member, a radial resilient arm on said clamping plate engaging said crystal unit, a first heater winding mounted on and surrounding said core member, an outer housing of heat-insulating material secured on said base around said cup member, and a second heater winding mounted on the inner walls of said outer housing coaxially with said first heater winding and surrounding said cup member.

11. A temperature-controlled crystal assembly comprising a base, an upstanding core member of substantial mass secured on said base, a crystal unit mounted on said base adjacent said core member, an inverted cup member of substantial mass centrally secured on said core member and surrounding said crystal unit, a clamping plate of heat-conducting material centrally secured between the top of said core member and the top wall of said cup member, a radial resilient arm on said clamping plate engaging said crystal unit, a first heater winding mounted on and surrounding said core member, an outer housing of heat-insulating material secured on said base around said cup member, a second heater winding mounted on the inner wall of said outer housing coaxially with said first heater winding and surrounding said cup member, a first thermostat mounted on said base adjacent said crystal unit and being controllingly connected to said first heater winding, and a second thermostat mounted on an inner surface portion of said outer housing and being controllingly connected to said second heater winding.

12. A temperature-controlled crystal assembly comprising a base having depending contact prongs, an upstanding metal core member of substantial mass secured on said base, a crystal unit mounted on said base adjacent said core member, a heater winding mounted on and surrounding said core member, a thermostat mounted on said base adjacent said crystal unit and being arranged to control said heater winding, an inverted cup member of substantial mas centrally secured on said core member and surrounding said crystal unit, a clamping plate of heat-conducting material centrally secured between the top of said core member and the top wall of said cup member and having a resilient radial arm engaging said crystal unit, an outer housing secured on said base around said cup member, a second heater winding mounted on the inner wall of said outer housing coaxially with the first-named heater winding and surrounding said cup member, a second thermostat mounted on an inner surface of said outer housing and being arranged to control said second heater winding, a first set of contact elements on said base connected to said depending contact prongs, and a second set of contact elements on said outer housing telescopically engaging said first set of contact elements, said second heater winding and second thermostat being connected to said second set of contact elements, whereby the second heater winding and second thermostat may be connected to an external circuit through said depending contact prongs.

References Cited in the file of this patent

UNITED STATES PATENTS

| | | |
|---|---|---|
| 2,438,345 | Miller | Mar. 23, 1948 |
| 2,607,818 | Richards | Aug. 19, 1952 |
| 2,651,731 | Overbey et al. | Sept. 8, 1953 |